(12) United States Patent
Masuoka et al.

(10) Patent No.: US 6,285,642 B1
(45) Date of Patent: Sep. 4, 2001

(54) DISK DEVICE WITH VIBRATION-INSULATING MECHANISM

(75) Inventors: Nobuo Masuoka; Atsushi Inoue; Tomomi Okamoto, all of Chigasaki; Kyuichiro Nagai, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/204,591

(22) Filed: Dec. 3, 1998

(30) Foreign Application Priority Data

Dec. 11, 1997 (JP) .................................................. 9-341007

(51) Int. Cl.7 .................................................. G11B 17/04
(52) U.S. Cl. ......................................... 369/75.2; 360/99.06
(58) Field of Search ........................... 360/99.06, 99.07, 360/99.02; 369/44.13, 80, 246, 247, 248, 75.1, 75.2, 77.2

(56) References Cited

U.S. PATENT DOCUMENTS

| | | | |
|---|---|---|---|
| 5,617,397 | * 4/1997 | Jones et al. | 369/77.2 |
| 5,867,338 | * 2/1999 | Ohira et al. | 369/75.2 |
| 6,021,108 | * 2/2000 | Arai et al. | 360/244 |
| 6,081,407 | * 6/2000 | Khuu | 360/99.06 |

FOREIGN PATENT DOCUMENTS 2-61881 1/1990 (JP) .
2641984 5/1997 (JP) .

* cited by examiner

*Primary Examiner*—William Klimowicz
*Assistant Examiner*—Tianjie Chen
(74) *Attorney, Agent, or Firm*—Mattingly, Stanger & Malur, P.C.

(57) ABSTRACT

A disk device for recording and reproducing information on a disk includes a spindle motor for rotating the disk, a head for reading and writing information signals from and on the disk, a feed mechanism for moving the head radially of the disk, a mechanism chassis having the spindle motor, head and feed mechanism thereon and a cartridge loading mechanism. A casing is provided for mounting the mechanism chassis through vibration insulating members. When a cartridge is to be loaded into a predetermined position, the cartridge is moved toward the mechanism chassis while the mechanism chassis is moved toward the cartridge, thereby providing vibration-insulating spaces.

1 Claim, 3 Drawing Sheets

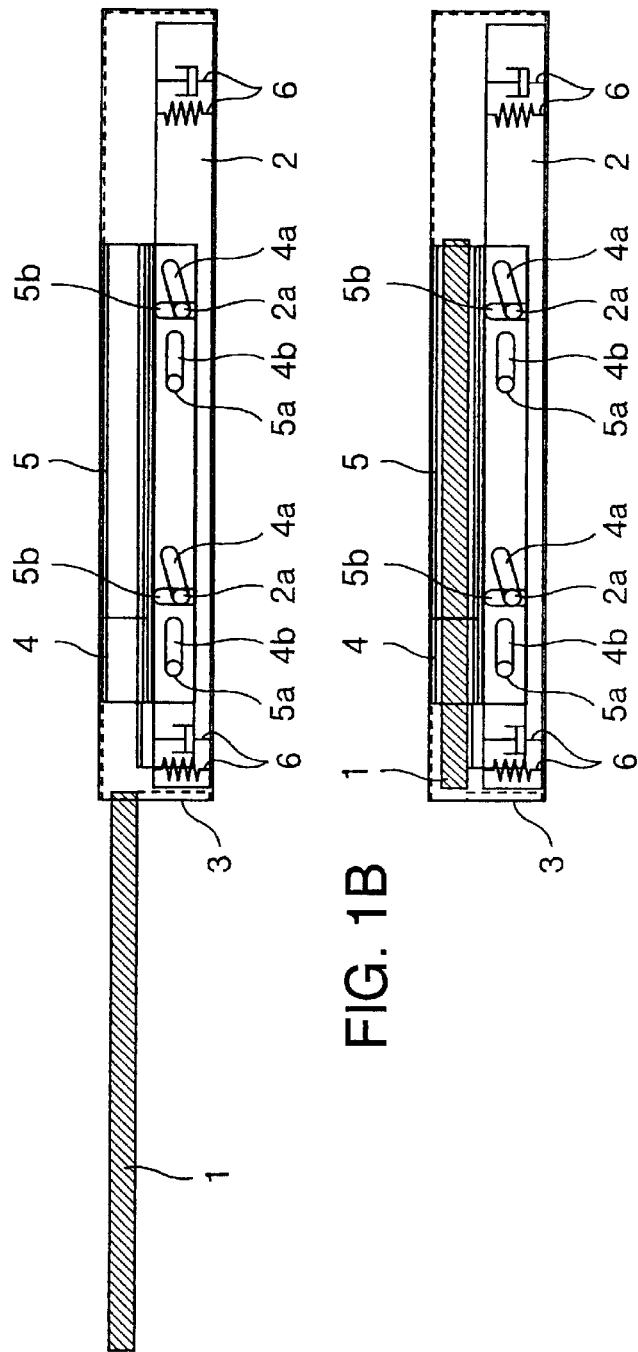

DISK DEVICE WITH VIBRATION-INSULATING MECHANISM

BACKGROUND OF THE INVENTION

This invention relates to a disk device or unit for recording and reproducing information relative to a disk such as an optical disk, and more particularly to a disk device provided with a vibration-insulating mechanism for preventing external vibrations from being transmitted to a disk drive mechanism portion.

One example of a mechanism for loading a cartridge, containing a disk therein, into a predetermined position of a mechanism chassis of a conventional disk device, is one, e.g. as disclosed in Japanese Patent No. 2,641,984, in which the cartridge is moved toward the mechanism chassis to be loaded into the predetermined position of the mechanism chassis. One example of a mechanism for preventing external vibrations from being transmitted to a mechanism chassis is one, e.g. as disclosed in Japanese Patent Unexamined Publication No. 2-61881, in which the mechanism chassis is mounted on a box-like casing with vibration-insulating members such as rubber put therebetween.

When the cartridge is moved toward the mechanism chassis to be loaded into the predetermined position of the mechanism chassis as described above, an unusable space is formed on that side of the cartridge, not facing the mechanism chassis, since the cartridge is moved toward the mechanism chassis. When the mechanism chassis is mounted on the box-like casing with the vibration-insulating members such as rubber put therebetween so that external vibrations will not be transmitted to a head on the mechanism chassis, it is necessary to secure a vibration-insulating space between the mechanism chassis and the box-like casing so that the mechanism chassis will not strike against the casing even when the mechanism chassis is shaken upward and downward by the vibrations.

The thickness of the disk device is determined by the sum of the thickness of the cartridge, the thickness of the space, formed as a result of movement of the cartridge, the thickness of the mechanism chassis and the thickness of the vibration-insulating space. Therefore, the thin design of the disk device has been achieved by reducing each of these thicknesses, but it is difficult to reduce the disk device into a thickness less than the above sum.

SUMMARY OF THE INVENTION

It is therefore an object of this invention to provide a disk device which has a thin design achieved by enhancing a space efficiency.

The above object has been achieved by a disk device of the present invention in which when a cartridge is to be loaded, the cartridge is moved toward a mechanism chassis while the mechanism chassis is moved toward the cartridge, thereby loading the cartridge into a predetermined position of the mechanism chassis. With this construction, at the time of loading the cartridge, a cartridge loading mechanism and the mechanism chassis are moved away from a box-like casing, so that a space is formed between the casing and each of the cartridge loading mechanism and the mechanism chassis, and these spaces can be used as vibration-insulating spaces, and therefore even if the mechanism chassis is shaken by external vibrations, the mechanism chassis will not strike against the casing, so that the transmission of the external vibrations to a head is greatly reduced.

At the time of discharging the cartridge, the mechanism chassis is moved away from the cartridge by a force produced by the cartridge loading mechanism, which loads the cartridge into the predetermined position of the mechanism chassis, to move the cartridge away from the mechanism chassis. With this construction, the cartridge and the mechanism chassis are moved by the common mechanism, and the number of the component parts is not increased, and the mechanism can be simplified.

In the cartridge loading mechanism, like a cartridge holder for holding the cartridge, a slider (which serves to move the cartridge holder) is moved toward the mechanism chassis at the time of loading the cartridge, and is moved away from the mechanism chassis at the time of discharging the cartridge. With this construction, the slider and the cartridge holder, which are the moving parts, can be provided only adjacent to that portion of the cartridge, not facing the mechanism chassis, and the opposite side surfaces of the mechanism chassis, and the moving portions of the cartridge loading mechanism do not come to the mechanism chassis portion, and therefore electric parts can be mounted on that portion of the mechanism chassis portion on which the mechanism parts, including a spindle motor, an optical head and a feed mechanism, are not mounted, and therefore the compact design of the disk device can be achieved.

If the amount of movement of the cartridge toward the mechanism chassis is made generally equal to the amount of movement of the mechanism chassis toward the cartridge, the space between the cartridge loading mechanism and the casing is generally equal to the space between the mechanism chassis and the casing. With this construction, all of these spaces can be used as movement spaces for vibration-insulating purposes, and therefore the thickness of the disk device can be reduced to a minimum.

In the above construction, after the cartridge is unloaded, the mechanism chassis and the cartridge are kept moved away from each other. However, there can be provided an arrangement in which after the unloading of the cartridge, the mechanism chassis is again moved toward the cartridge, and with this construction, a time period, during which vibration-insulating members such as rubber are kept compressed, is short, and therefore creep is less liable to develop in these vibration-insulating members, so that the lifetime of the disk device is significantly prolonged.

As described above in detail, in the disk device of the present invention, when the cartridge is to be loaded, the cartridge is moved toward the mechanism chassis while the mechanism chassis is moved toward the cartridge, thereby loading the cartridge into the predetermined position of the mechanism chassis. Therefore, at the time of loading the cartridge, the cartridge loading mechanism and the mechanism chassis are moved away from the box-like casing, so that a space is formed between the casing and each of the cartridge loading mechanism and the mechanism chassis, and even if the mechanism chassis is shaken by external vibrations, the mechanism chassis will not strike against the casing, and therefore the transmission of the external vibrations to the optical head is prevented by the vibration-insulating members.

The mechanism chassis is moved away from the cartridge by the force produced by the cartridge loading mechanism to move the cartridge away from the mechanism chassis. With this construction, the cartridge and the mechanism chassis are moved by a common mechanism, and the number of the component parts is not increased, and the mechanism can be simplified.

Like the cartridge holder, the slider which serves to move the cartridge holder is moved toward the mechanism chassis at the time of loading the cartridge, and is moved away from the mechanism chassis at the time of discharging the cartridge. With this construction, the slider and the cartridge holder, which are the moving parts, can be provided only adjacent to that portion of the cartridge, facing away from the mechanism chassis, and the opposite side surfaces of the mechanism chassis. With this construction, the moving portions of the cartridge loading mechanism do not come to the mechanism chassis portion, and therefore electric parts can be mounted on that portion of the mechanism chassis portion on which the mechanism parts, including the spindle motor, the head and the feed mechanism, are not mounted, and therefore the compact design of the disk device can be achieved.

If the amount of movement of the cartridge toward the mechanism chassis is generally equal to the amount of movement of the mechanism chassis toward the cartridge, the space between the cartridge loading mechanism and the casing is generally equal to the space between the mechanism chassis and the casing. With this construction, all of these spaces can be used as movement spaces for vibration-insulating purposes, and therefore the thickness of the disk device can be reduced to a minimum.

In the above construction, after the cartridge is unloaded, the mechanism chassis and the cartridge are kept moved away from each other. However, there can be provided an arrangement in which after the unloading of the cartridge, the mechanism chassis is again moved toward the cartridge, and with this construction, a time period, during which vibration-insulating members such as rubber are kept compressed, is short, and therefore the deterioration of the properties of the vibration-insulating members due to creep is less liable to occur, so that the lifetime of the disk device is much prolonged.

BRIEF DESCRIPTION OF THE DRAWINGS

FIGS. 1A to 1C are side-elevational views of an optical disk device of the present invention;

DESCRIPTION OF THE PREFERRED EMBODIMENTS

One preferred embodiment of an optical disk device of the present invention, using an optical disk, will now be described with reference to the drawings.

Figure 2A:
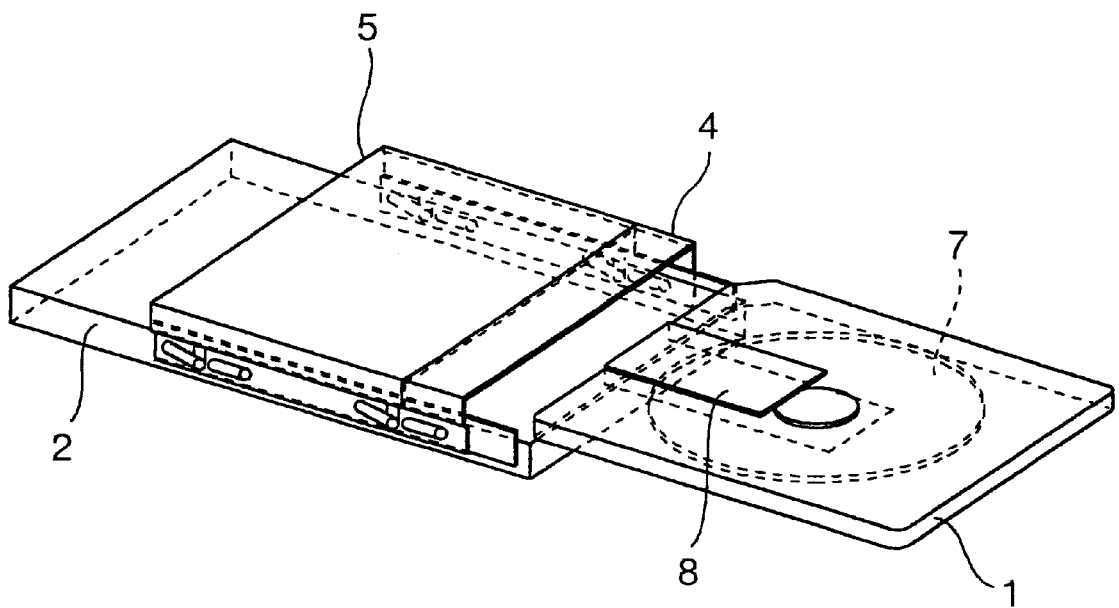
FIGS. 2A and 2B are perspective views of the optical disk device of the invention.
Figure 2B:
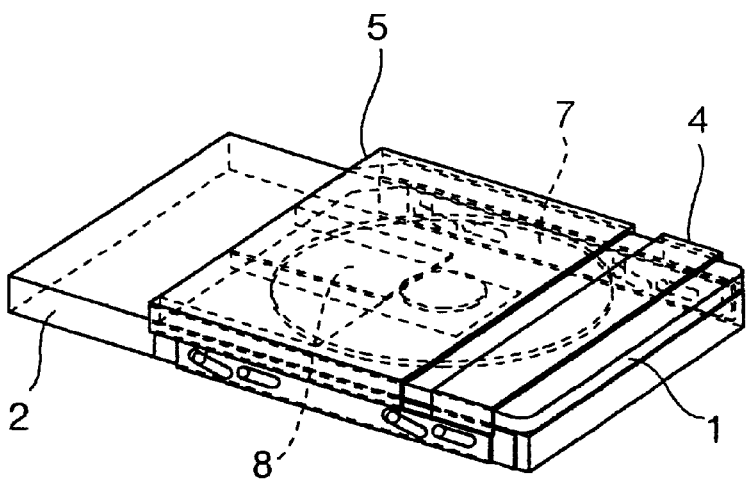
Figure 3:
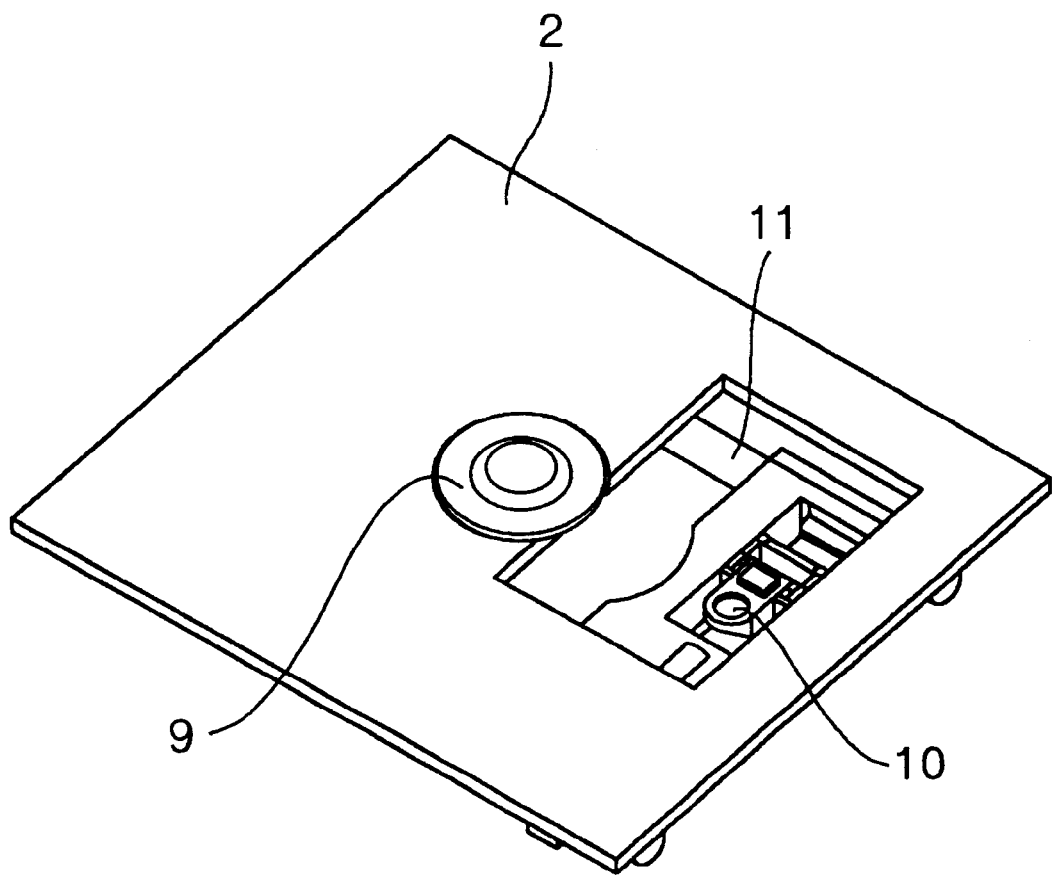
FIG. 3 is a perspective view of a mechanism chassis of the optical disk device of the invention.

FIGS. 1A to 1C are side-elevational views of the optical disk device, FIGS. 2A and 2B are perspective views thereof, and FIG. 3 is a perspective view of a mechanism chassis of the optical disk device. In FIGS. 2A and 2B, the showing of a box-like casing is omitted in order to show the interior of the optical disk device. A cartridge 1 has a optical disk 7 rotatably contained therein, and the cartridge 1 has an access port for an optical head 10, and this access port is normally closed by a shutter 8 so as to prevent entering of dust and dirt therethrough, as shown in FIG. 2A. When the cartridge 1 is to be inserted into the disk device, the shutter 8 is slid by a shutter opening-closing mechanism (not shown), thereby exposing the access port, and then when the cartridge 1 is loaded into a predetermined position of the mechanism chassis 2, a spindle motor 9 is engaged with the optical disk 7 in the cartridge 1 so as to drive or rotate the optical disk 7. The optical head 10 is disposed near to a recording surface of the optical disk 7, exposed through the access port in the cartridge 1, and is moved radially of the optical disk 7 to read information signals from the optical disk 7 and also to write information signals onto the optical disk 7. The optical head 10 is moved by a feed mechanism 11. The spindle motor 9, the optical head 10 and the feed mechanism 11 are mounted on the mechanism chassis 2.

If vibrations are transmitted from the exterior to the optical head 10 when the optical head 10 reads and writes information signals relative to the optical disk 7, an error such as a tracking error occurs, and therefore as shown in FIGS. 1A to 1C, the mechanism chassis 2, having the optical head 10 mounted thereon, is mounted on the casing 3 through vibration-insulating members 6, such as rubber, so that the external vibrations will not be transmitted to the optical head 10.

Next, reference will be made to a cartridge loading mechanism for loading the cartridge 1 into the predetermined position of the mechanism chassis 2. Directions hereafter referred to will be directions shown in FIGS. 1A to 1C. For example, that side of the disk device where the cartridge 1 is located is an upper side, and that side where the mechanism chassis 2 is located is a lower side, and the cartridge 1 is inserted from the left to the right.

As described above, the spindle motor 9 for engagement with the optical disk 7, and the optical head 10 for being disposed near to the recording surface of the optical disk 7 are mounted on the mechanism chassis 2, and therefore in order to prevent the inserted cartridge 1 from interfering with the spindle motor 9 and the optical head 10, the cartridge 1 must be inserted in such a manner that the cartridge 1 is spaced a certain distance from the mechanism chassis 2 as shown in FIGS. 1A and 1B. After the cartridge 1 is thus inserted, the cartridge 1 is moved toward the mechanism chassis 2 so as to bring the optical disk 7 into engagement with the spindle motor 9 as shown in FIG. 1C. This downward movement of the cartridge 1 is effected by the cartridge loading mechanism.

The cartridge loading mechanism will now be described in detail. The cartridge loading mechanism comprises a cartridge holder 5 for holding the cartridge 1, and a slider 4 for moving the cartridge holder 5 upward and downward. The slider 4 is mounted on the mechanism chassis 2 for reciprocal sliding movement in the right-hand and left-hand directions (FIG. 1). As shown in the drawings, the slider 4 has slanting grooves 4a, and pins 2a, formed on and projecting from the mechanism chassis 2, are engaged respectively in the grooves 4a, and the slider 4, when moved in the left-hand direction (FIGS. 1A to 1C), is moved downward. The slider 4 also has grooves 4b in which pins 5a, formed on and projecting from the cartridge holder 5, are engaged respectively, and therefore the cartridge holder 5 is moved downward in accordance with the downward movement of the slider 4. Therefore, when the slider 4 is moved left, the cartridge holder 5 is moved downward, and therefore the cartridge 1, held in the cartridge holder 5, is also moved downward, and is loaded into the predetermined position of the mechanism chassis 2. For discharging or unloading the cartridge 1, the slider 4 is moved in the right-hand direction opposite to the direction of movement of the slider 4 for the loading operation to thereby move the cartridge 1 upward. In the illustrated embodiment, although the cartridge 1 is moved toward the mechanism chassis 2 in accordance with the movement of the slider 4 in the left-hand direction, there may be used an arrangement in which the cartridge 1 is moved toward the mechanism chassis 2 in accordance with the movement of the slider 4 in the right-hand direction.

The mechanism chassis 2 is mounted on the box-like casing 3 with the vibration-insulating members 6 such as rubber as put therebetween, and when a force is not applied from the exterior to the mechanism chassis 2, the mechanism chassis 2 is located in the position shown in FIG. 1C. An upper wall of the casing 3 is disposed above the cartridge holder 5 and the slider 4, and limits the upward movement of the cartridge holder 5 and the slider 4. Therefore, when the cartridge holder 5 and the slider 4 are operated to move upward, the cartridge holder 5 and the slider 4 are first moved upward halfway as shown in FIG. 1B, but after the cartridge holder 5 and the slider 4 are brought into contact with the casing 3 as shown in FIG. 1A, the vibration insulating members 6 are compressed by a force, serving to move the cartridge holder 5 and the slider 4 upward, so that the mechanism chassis 2 is moved downward.

As shown by a comparison of FIGS. 1A and 1C, the chassis in FIG. 1A is in a position lower than in FIG. 1C, thereby causing the vibration insulating members 6 to be compressed. Thus, when the cartridge 1 is to loaded into the predetermined position of the mechanism chassis 2, the cartridge 1, the cartridge holder 5 and the slider 4 are moved downward while the mechanism chassis 2 is moved upward, and therefore a space is formed between the casing 3 and each of the mechanism chassis 2 and the cartridge loading mechanism, and by using these spaces as vibration-insulating spaces, external vibrations can be prevented from being transmitted to the optical head 10. When the cartridge 1 is not loaded, the optical head 10 does not write and read the information signals, and therefore even if external vibrations are transmitted to the optical head 10 because of the absence of the vibration-insulating space, this will not affect the performance.

In a conventional optical disk device, when loading the cartridge 1, the mechanism chassis 2 is not moved toward the cartridge 1, and therefore it has been necessary to provide the vibration-insulating space between the mechanism chassis 2 and the casing 3. On the other hand, in the optical disk device of the present invention, when loading the cartridge 1, the mechanism chassis 2 is so moved as to provide the vibration-insulating space between the mechanism chassis 2 and the casing 3, as shown in FIG. 1C and therefore a thin design of the disk device can be achieved. Moreover, the mechanism chassis 2 is moved by the force produced by the cartridge loading mechanism, which moves the cartridge 1, to move the cartridge 1 away from the mechanism chassis 2, and therefore there is no need to provide any additional mechanism for moving the mechanism chassis 2, and the number of the component parts is not increased.

Furthermore, the slider 4, serving to move the cartridge holder 5, has such a configuration (see FIGS. 2A and 2B) that opposite side walls of the slider 4, each having the grooves 4a and 4b, are interconnected by a top wall thereof disposed adjacent to that side of the cartridge 1 facing away from the mechanism chassis 2, and like the cartridge holder 5, the slider 4 is moved toward the mechanism chassis 2 when loading the cartridge 1, and is also moved away from the mechanism chassis 2 when unloading the cartridge 1, and with this construction the slider 4 and the cartridge holder 5, which are the moving parts, can be provided only adjacent to that portion of the cartridge 1, facing away from the mechanism chassis 2, and the opposite side surfaces of the mechanism chassis 2, and the moving portions of the cartridge loading mechanism do not come to the mechanism chassis portion 2, and therefore electric parts can be mounted on that portion of the mechanism chassis portion 2 on which the mechanism parts, including the spindle motor 9, the optical head 10 and the feed mechanism 11, are not mounted, and therefore the compact design of the disk device can be achieved.

In the above optical disk device of the present invention, although the mechanism chassis 2 is moved by the force serving to move the cartridge 1 away from the mechanism chassis 2, the thin design of the disk device can also be achieved by providing a separate mechanism for moving the mechanism chassis 2.

In the above construction, although the slider 4 is moved upward and downward together with the cartridge holder 5, the thin design of the disk device can also be achieved by an arrangement in which the slider 4 is moved only left and right while the cartridge holder 5 is moved only upward and downward.

If the amount of movement of the cartridge 1 toward the mechanism chassis 2 is generally equal to the amount of movement of the mechanism chassis 2 toward the cartridge 1, the space between the cartridge loading mechanism and the casing 3 is generally equal to the space between the mechanism chassis 2 and the casing 3, and with this construction, all of these spaces can be used as movement spaces for vibration-insulating purposes, and therefore the thickness of the disk device can be reduced to a minimum.

In the above optical disk device, when the cartridge is unloaded or discharged from the disk device, the mechanism chassis 2 and the cartridge loading mechanism are disposed such that the cartridge 1 is kept moved away from the mechanism chassis 2. However, after the unloading of the cartridge 1, the cartridge loading mechanism can be again operated so as to move the mechanism chassis 2 into a position equivalent to the position where the mechanism chassis 2 is located when the cartridge 1 is loaded, and by doing so, similar effects can also be obtained, and besides the vibration-insulating members 6 are compressed only when the cartridge loading mechanism is operated, and therefore the deterioration of the properties of the vibration-insulating members 6 due to creep is less liable to occur, so that the lifetime of the disk device is much prolonged.

The present invention can be applied not only to the disk device for the optical disk but also to a disk device for writing and reading information relative to an optomagnetic disk or a magnetic disk.

What is claimed is:

1. A disk device comprising:

a spindle motor for rotating a disk;

a head for reading and writing information signals relative to said disk;

a feed mechanism for moving said head radially of said disk;

a mechanism chassis having said spindle motor, said head and the feed mechanism mounted thereon;

a cartridge loading mechanism including a cartridge holder for holding a cartridge containing the disk, and a slider disposed reciprocally slidable in a direction of insertion of said cartridge, said cartridge loading mechanism for loading a cartridge, held in said mechanism chassis, into a predetermined position of said mechanism chassis; and a casing for mounting said mechanism chassis thereon through vibration-insulating members, wherein when said cartridge is to be loaded into the predetermined position of said mechanism chassis and in a state capable of recording and/or reproducing information signals, said cartridge holder is separated from an upper wall of said casing, and said mechanism chassis is in a state of being supported by said vibration-insulating members so as to prevent transmitting of vibration, and when said cartridge is transferred from said state of being supported by said vibration-insulating members to a state of capable of being discharged from and inserted into the disk device, after said cartridge holder is moved toward the upper wall of said casing in accordance with a movement of said slider and prevented from movement thereof by the casing, said mechanism chassis is moved toward a lower wall of said casing by the movement of said slider so as to make said vibration-insulating members more compressed than when in a state of capable of recording and/or reproducing said information signals; and wherein when said disk device is changed from the state of capable of recording and/or reproducing the information signals to a state of capable of discharging said cartridge from and inserting it into the disk device, the amount of a movement of said cartridge holder toward said casing is substantially equal to the amount of a movement of said mechanism chassis toward the vibration-insulating members.

* * * * *